(12) United States Patent
Zheng et al.

(10) Patent No.: US 8,675,540 B2
(45) Date of Patent: Mar. 18, 2014

(54) RESOURCE ALLOCATION METHOD, RESOURCE INDICATION METHOD AND MOBILE STATION USING THE SAME

(75) Inventors: Yan-Xiu Zheng, Taipei Hsien (TW);
Yu-Chuan Fang, Taipei Hsien (TW);
Tsung-Lien Ho, Taipei Hsien (TW);
Chun-Yuan Chiu, Taipei Hsien (TW);
Chang-Lan Tsai, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 542 days.

(21) Appl. No.: 12/957,402

(22) Filed: Dec. 1, 2010

(65) Prior Publication Data

US 2011/0158148 A1     Jun. 30, 2011

Related U.S. Application Data

(60) Provisional application No. 61/290,874, filed on Dec. 29, 2009.

(51) Int. Cl.
*H04H 20/71*     (2008.01)

(52) U.S. Cl.
USPC ............................................. 370/312; 370/478

(58) Field of Classification Search
USPC ..................... 370/312, 328, 329, 310, 330
See application file for complete search history.

(56) References Cited

U.S. PATENT DOCUMENTS

| 7,616,593 | B2 | 11/2009 | Jung et al. | |
|---|---|---|---|---|
| 8,208,438 | B2 * | 6/2012 | Han et al. | 370/330 |
| 8,208,569 | B2 * | 6/2012 | Miyoshi et al. | 375/260 |
| 8,538,344 | B2 * | 9/2013 | Golitschek | 455/67.11 |
| 8,538,482 | B2 * | 9/2013 | Koo et al. | 455/562.1 |
| 2006/0009200 | A1 | 1/2006 | Jung et al. | |
| 2007/0002958 | A1 * | 1/2007 | Chang et al. | 375/260 |
| 2007/0253367 | A1 * | 11/2007 | Dang et al. | 370/329 |

(Continued)

FOREIGN PATENT DOCUMENTS

| TW | 200522754 | 7/2005 |
|---|---|---|
| TW | 2009050392 | 12/2009 |

(Continued)

OTHER PUBLICATIONS

IEEE Standard for Local and metropolitan area networks "Part 16: Air Interface for Broadband Wireless Access Systems", issued on May 29, 2009, p. 1-p. 2082.

(Continued)

*Primary Examiner* — Bunjob Jaroenchonwanit
(74) *Attorney, Agent, or Firm* — Jianq Chyun IP Office (57) ABSTRACT

A resource allocation method and a resource indication method for E-MBS system, and a mobile station using the same are proposed. The resource units of a first service flow are allocated following the end of the E-MBS MAP of the E-MBS region, along with the increasing of frequency domain index. When the edge of the E-MBS region in frequency domain is reached, the resource units of mth service flow are continued to be allocated from top frequency domain index in next time domain index, where m is an integer greater than or equal to 1. The resource units of m+1th service flow are allocated following the mth service flow, and such procedures are repeated until all service flows are allocated required resource units. The resource indication method indicates a specific service flow by absolute location in the E-MBS region formed based upon the resource allocation method.

17 Claims, 9 Drawing Sheets

(56) References Cited

U.S. PATENT DOCUMENTS

| | | | |
|---|---|---|---|
| 2007/0268933 | A1 | 11/2007 | Wu et al. |
| 2007/0286066 | A1 | 12/2007 | Zhang et al. |
| 2009/0097447 | A1 | 4/2009 | Han et al. |
| 2009/0177937 | A1* | 7/2009 | Lee et al. .................. 714/748 |
| 2009/0209264 | A1* | 8/2009 | Yang et al. ................ 455/452.1 |
| 2009/0225692 | A1* | 9/2009 | Son .......................... 370/312 |
| 2010/0103897 | A1 | 4/2010 | Suh et al. |
| 2010/0272000 | A1* | 10/2010 | Chen et al. ................. 370/312 |
| 2010/0291940 | A1* | 11/2010 | Koo et al. .................. 455/450 |
| 2011/0058511 | A1* | 3/2011 | Kim et al. .................. 370/312 |
| 2011/0158148 | A1* | 6/2011 | Zheng et al. ................ 370/312 |
| 2011/0268043 | A1* | 11/2011 | Golitschek Edler Von Elbwart ..................... 370/329 |
| 2011/0268070 | A1* | 11/2011 | Guan et al. ................. 370/329 |
| 2012/0088515 | A1* | 4/2012 | Choi et al. .................. 455/450 |
| 2012/0207073 | A1* | 8/2012 | Kim et al. .................. 370/311 |
| 2013/0010623 | A1* | 1/2013 | Golitschek ................. 370/252 |

FOREIGN PATENT DOCUMENTS

| | | |
|---|---|---|
| TW | 201021495 | 6/2010 |
| WO | 2006065069 | 6/2006 |
| WO | 2009062115 | 5/2009 |

OTHER PUBLICATIONS

IEEE Computer Society et al., "Part 16: Air Interface for Broadband Wireless Access Systems", IEEE Standard for Local and Metropolitan Area Network, IEEE Std 802.16, May 2009, p. 251, p. 469, p. 698-p. 701, p. 744-p. 745.

"First Office Action of China Counterpart Application", issued on Mar. 26, 2013, p. 1-p. 7.

"Office Action of Taiwan Counterpart Application", issued on Jul. 8, 2013, p. 1-p. 9.

* cited by examiner

| Syntax | Size (bits) | |
|---|---|---|
| E-MBS-DATA_IE() { | | |
| No. of E-MBS IDs+FIDs | 8 | Total number of E-MBS streams in the IE. |
| for(i=0; i< No. of E-MBS IDs+FIDs; i++) { | | |
| E-MSB ID+FID | 16 | E-MBS ID + Flow ID of an E-MBS stream. |
| ⋮ | ⋮ | |
| E-MBS AAI subframe offset | variable | Include the location of the AAI subframe where the E-MBS data burst ends<br>MSI == 0b00: 6 bits,  MSI == 0b01: 7 bits<br>MSI == 0b10: 8 bits,  MSI == 0b11: 9 bits |
| E-MBS Resource Indexing | 7 | Includes the location of the SLRU index where the E-MBS data burst ends |
| ~ | ~ | |
| ~ | ~ | |

RESOURCE ALLOCATION METHOD, RESOURCE INDICATION METHOD AND MOBILE STATION USING THE SAME

CROSS-REFERENCE TO RELATED APPLICATION

This application claims the priority benefit of U.S. provisional application Ser. No. 61/290,874, filed on Dec. 29, 2009. The entirety of the above-mentioned patent application is hereby incorporated by reference herein and made a part of this specification.

BACKGROUND

1. Technical Field

The invention relates to a resource indication format for an enhanced multicast and broadcast service (E-MBS) in IEEE 802.16m, and particularly, relates to a resource allocation method and a resource indication method for the E-MBS system, and a mobile station using the same.

2. Related Art

Figure 1A:
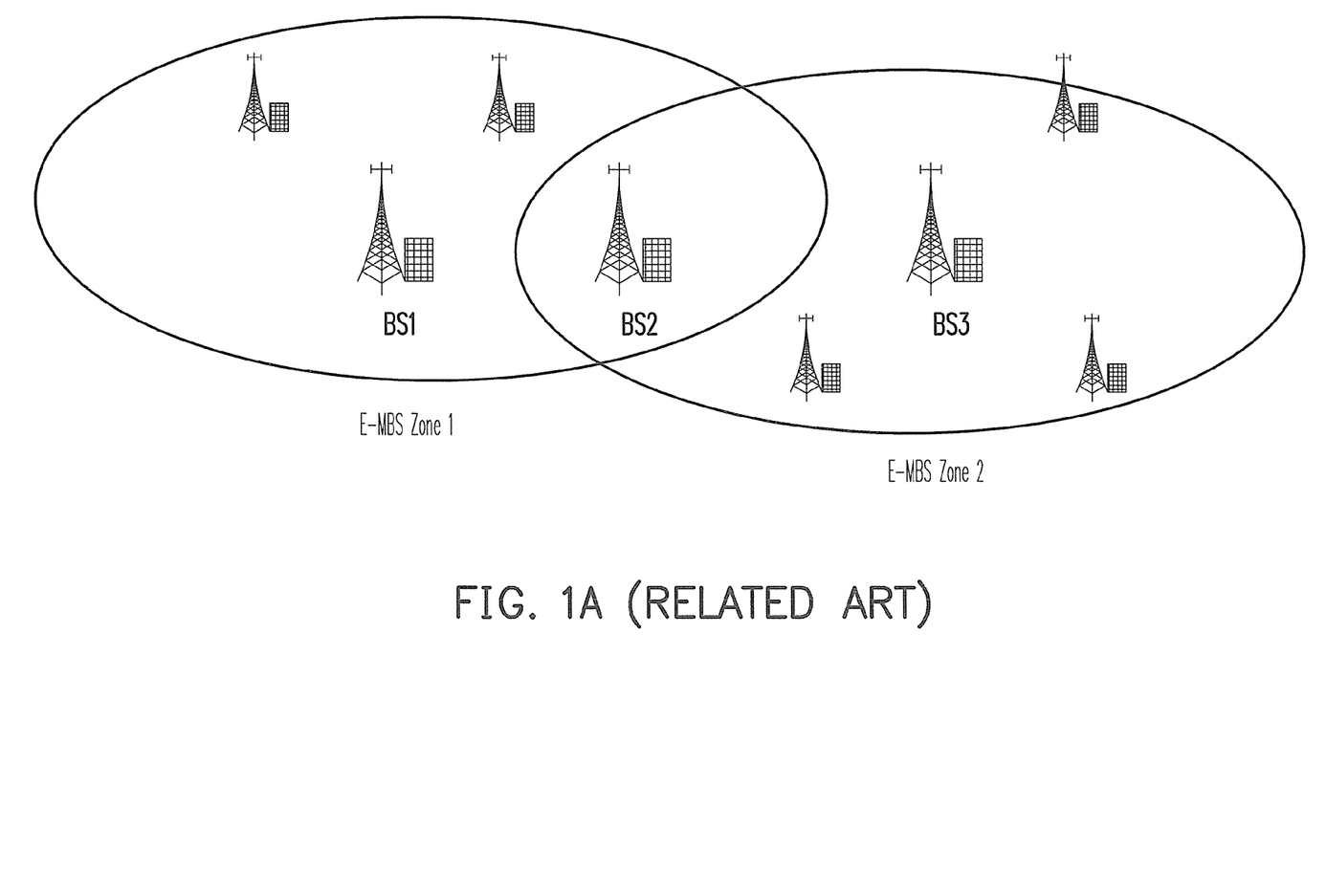
FIG. 1A illustrates an enhanced multicast and broadcast service (E-MBS) system.

FIG. 1A illustrates an enhanced multicast and broadcast service (E-MBS) system. In an orthogonal frequency division multiple access (OFDMA) system such as IEEE 802.16m system, the E-MBS data are allocated in a pre-defined time-frequency region. Referring to FIG. 1A, in the E-MBS system 10, an E-MBS zone such as an E-MBS Zone 1 in FIG. 1A consists of multiple base stations (BSs), which can transmit the same data to a group of terminals or mobile stations (MSs) within the coverage of the E-MBS Zone 1. The base station BS1 transmits a first set of E-MBS flows to MSs within the coverage of the base station BS1. Another E-MBS Zone 2 also consists of multiple base stations (BSs) transmitting another set of data to a group of terminals or MSs within the coverage of the E-MBS Zone 2. The base station BS3 transmits a first set of E-MBS flows to MSs within the coverage of the base station BS3.

However, there may be multiple service flows for an E-MBS Zone such as the base station BS2 as shown in FIG. 1A. A base station can belong to multiple E-MBS zone such as the overlapping situation shown in FIG. 1A, where the base station BS2 is located in an intersection of the E-MBS Zone 1 and the E-MBS Zone 2. The base station BS2 can simultaneously transmit the first set of E-MBS flows and the second set of E-MBS flows to MSs within its coverage. The base station BS2 belongs to both the E-MBS Zone 1 and E-MBS Zone 2. To be more specific, an E-MBS Zone can be described as a set of BSs or Advanced BSs (ABS) where the same E-MBS identifier (ID) and flow IDs are used for transmitting the content of certain service flows. Here, the service flows can be, for example, video program or audio program. Also, the service flows can be broadcast, multicast or even unicast to MSs. On the other hand, an E-MBS region is a two-dimensional time-frequency resource for the E-MBS in the downlink.

Figure 1B:
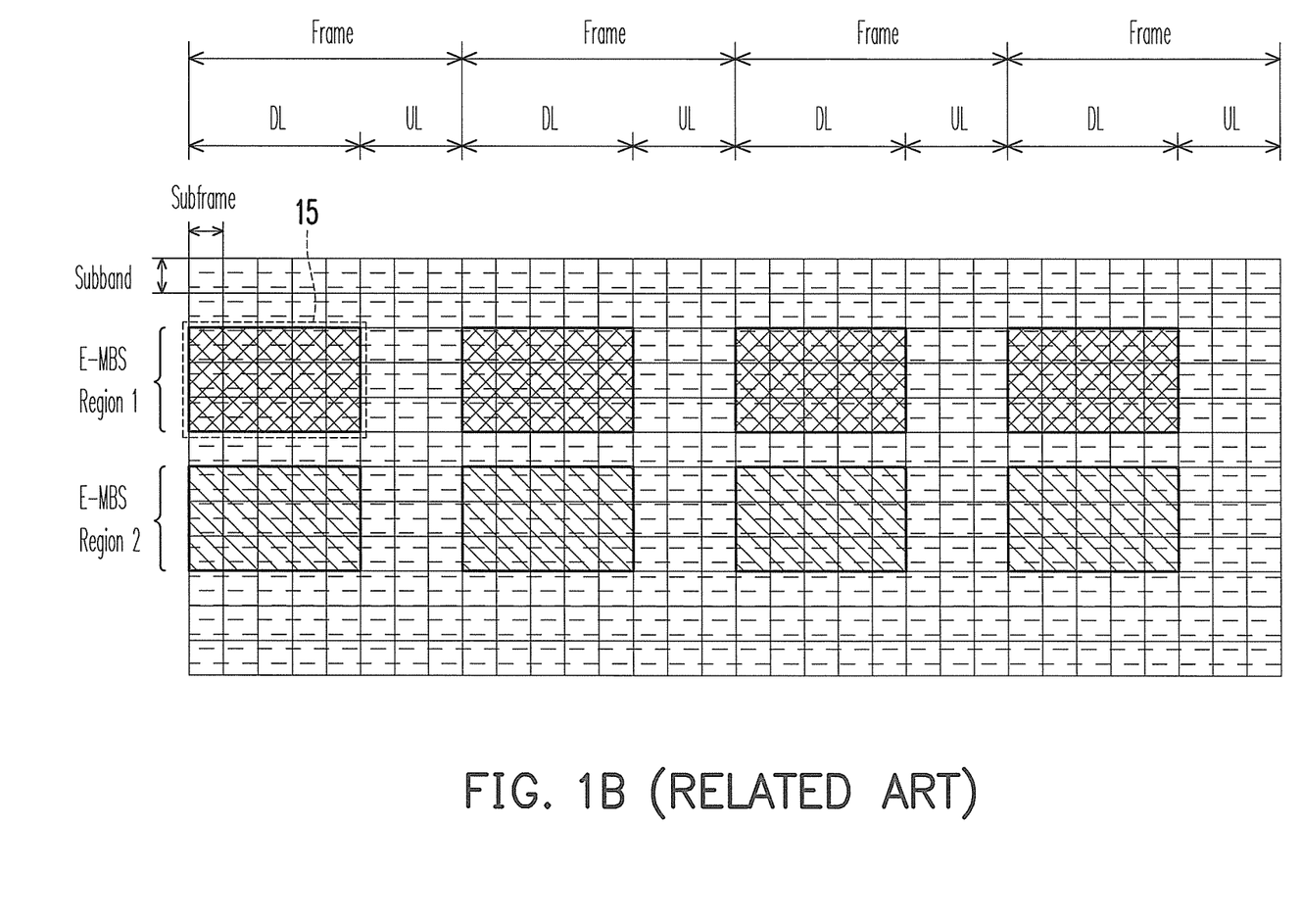
FIG. 1B is a schematic diagram illustrating E-MBS data allocated in pre-defined time-frequency regions.

FIG. 1B is a schematic diagram illustrating E-MBS data allocated in pre-defined time-frequency regions. Referring to both FIG. 1A and FIG. 1B, E-MBS region 1 is the time-frequency resource allocated for the E-MBS zone 1 and E-MBS region 2 is the time-frequency resource allocated for the E-MBS zone 2. The base station BS2 transmits OFDM time-frequency resource including both the E-MBS region 1 and the E-MBS region 2. In the two-dimensional time-frequency resource for the E-MBS illustrated in FIG. 1B, the vertical axis is in frequency domain which includes multiple subbands, and each one of the subbands includes, for example, 4 resource units in frequency domain. Also, each one of the resource units includes, for example, 18 subcarriers. On the other hand, the horizontal axis in FIG. 1B is in time domain, which includes multiple frames, and each one of the frames can include multiple subframes. The total OFDM time-frequency resource, for example, can be allocated a 10 MHz bandwidth, and each one of the frames can be, for example, 5 milliseconds.

In the IEEE 802.16m system, the minimum downlink (DL) resource allocation is an physical resource unit (PRU), which consists of $P_{sc}$ consecutive subcarriers by $N_{sym}$ consecutive symbols in time domain. $N_{sym}$ is the number of symbols of a subframe. In addition, 4 PRUs form a subband in frequency domain.

An E-MBS zone is defined as the coverage of multiple BSs that transmit the same multicast or broadcast data. The BSs in the same E-MBS zone are allocated an identical time-frequency region transmitting the same data. The region allocation parameters are specified by BS control channel. For example, In the E-MBS Zone 1, the base station BS2 can transmit multiple service flows, which are distinguished by different flow IDs. The E-MBS MAP in the IEEE 802.16 standard, at the beginning of the E-MBS region 1, includes the flow ID and the resource allocation information for each one of the service flows in this E-MBS zone 1. The terminals or MSs, which are intended to decode multicast/broadcast data in this E-MBS zone 1, must decode the A-MAP to find out the location of a specific service flow in the E-MBS region according to the flow ID and the resource indication for each one of the service flows.

The conventional approach of indicating resource for each one of the service flows based on IEEE 802.16-2009 frame is to allocate a complete rectangular E-MBS region containing several service flows which are configured in MAC layer. The rectangular E-MBS region is indicated by four parameters such as a two-dimensional left-upper corner (both time offset and frequency offset), the width of the rectangular B-MBS region (the number of symbols) and the length of the E-MBS region (the number of subbands or subchannels). The aforementioned conventional approach in fact wastes resource. Therefore, it is an important issue to find an effective and efficient resource indication format and resource indication scheme so as to enhance E-MBS system performance.

SUMMARY

Accordingly, the invention proposes a resource allocation method, a resource indication method and a mobile station using the same. The invention provides an efficient resource allocation method, and a resource indication method for each service flows in the E-MBS region for IEEE 802.16 E-MBS system.

A resource allocation method is introduced herein. The resource allocation method is adapted for allocating resource units for service flows in an E-MBS region of an E-MBS system. According to an exemplary embodiment of the invention, the resource indication method includes following steps: (a) the resource units of a first service flow are allocated following the end of the E-MBS MAP of the E-MBS region; (b) the resource units of an mth service flow are allocated along with the increasing of frequency domain index, where m is an integer greater than or equal to 1; (c) the resource units of the mth service flow are continued to be allocated from the top frequency domain index in the next time domain index when the edge of the E-MBS region in the frequency domain is reached; (d) the resource units of a m+1th service flow are allocated following the mth service flow; and (e) the step (b), the step (c) and the step (d) are repeated until all service flows are allocated required resource units.

A resource indication method is introduced herein. The resource indication method is adapted for indicating service flows in an E-MBS region of an E-MBS system. According to an exemplary embodiment of the invention, the resource indication method includes following steps. The location of each one of at least a service flow in the E-MBS region is indicated at E-MBS MAP of the E-MBS region. In addition, the resource units of a first service flow are allocated following the end of E-MBS MAP of the E-MBS region, the resource units of an mth service flow are allocated along with the increasing of frequency domain index, where m is an integer greater than or equal to 1, the resource units of the mth service flow are continued to be allocated from the top frequency domain index in the next time domain index when the edge of the E-MBS region in the frequency domain is reached, and the resource units of a m+1th service flow are allocated following the mth service flow.

A mobile station is introduced herein. The mobile station is adapted for decoding service flows in a frame of an E-MBS system, where the frame includes at least an E-MBS region. According to an exemplary embodiment, the mobile station includes at least a transceiver module and at least a protocol stack module. The at least protocol stack module further comprises at least a service flow locator unit. The at least a transceiver module is configured for receiving at least an E-MBS region broadcast or multicast in the E-MBS system. The at least a protocol stack module, coupled to the at least a transceiver module is configured for performing processing on the at least an E-MBS region. The at least a service flow locator unit is configured for searching the location of a specific service flow in the at least an E-MBS region according to the location of each one of the at least a service flow in the at least an E-MBS region indicated at the E-MBS MAP in the E-MBS region. In addition, the resource units of a first service flow are allocated following the end of E-MBS MAP of the at least E-MBS region, and the resource units of an m+1th service flow are allocated following the mth service flow, wherein m is an integer greater than or equal to 1.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF THE EXEMPLARY EMBODIMENTS

Reference will now be made in detail to the exemplary embodiments of the present invention, examples of which are illustrated in the accompanying drawings. Wherever possible, the same reference numbers are used in the drawings and the description to refer to the same or like parts.

The resource allocation method and the resource indication method proposed by the invention do not allocate resource in a complete rectangular block of an IEEE 802.16 frame. Instead, the resource allocation method indicates each of the service flows by an absolute location. The resource indication method proposed in the invention uses just two parameters for indication each one of the service flows compared to four parameters required for the conventional approach. Therefore, the resource indication method is more efficient than the conventional approach in terms of data transmission as well as decoding processes. In addition, the resource indication method can save more unused resource in an IEEE 802.16e frame, and the save resource can be thus used for unicasting data to mobile stations, for example.

The general concept of the invention can be applied to IEEE 802.16 system and other wireless multi-carrier systems such as 3GPP long term evolution (LTE) system. Moreover, the term "MS" can also mean a "advanced mobile station" (AMS) or a "user equipment" (UE), and the term "BS" can also mean an "Advanced Base Station" (ABS) or a "Node B" or an "enhanced node B" (eNodeB) in other wireless multi-carrier systems. In addition, the MS can be mobile stations such as a smartphone, a notebook, a netbook, a television, a personal computer (PC) and a tablet PC.

Figure 2:
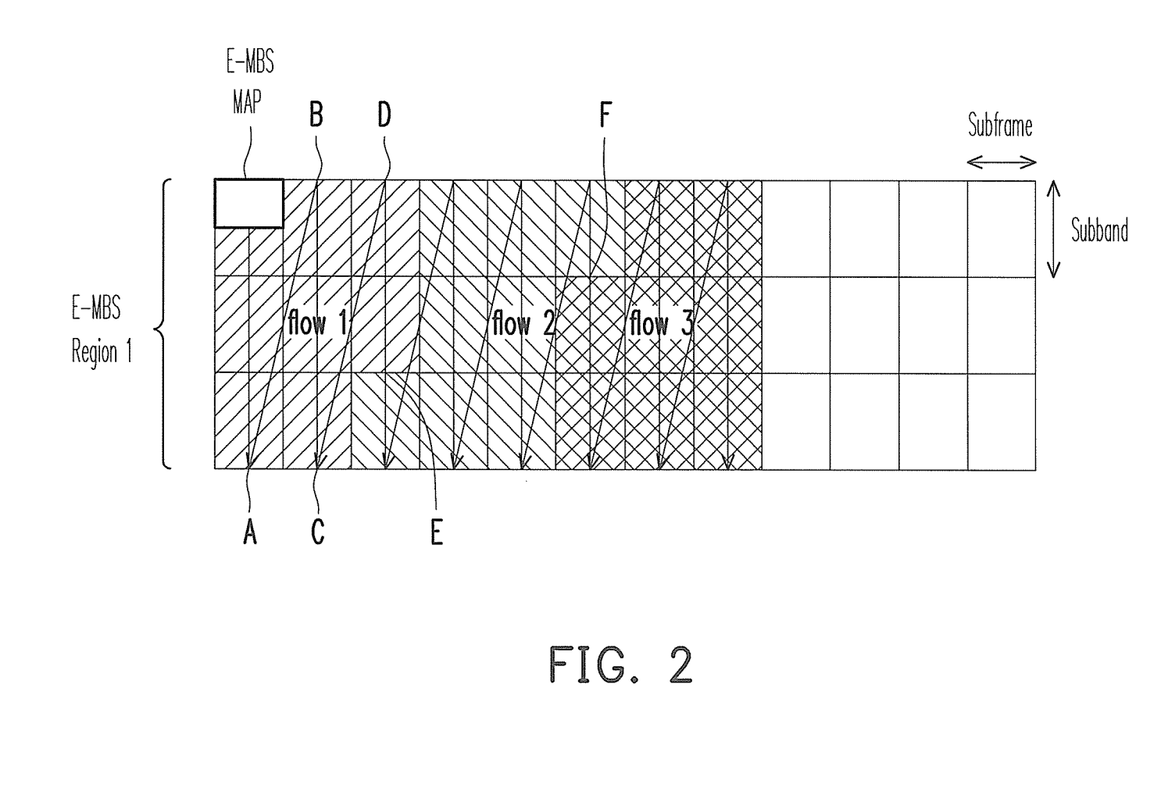
FIG. 2 is schematic diagram illustrates a resource allocation method according to a first exemplary embodiment of the invention.

FIG. 2 is schematic diagram illustrates a resource allocation method according to a first exemplary embodiment of the invention. Referring to FIG. 2, for the advanced OFDMA frame structure (such as in IEEE 802.16m system), the resource allocation method proposed by the invention is to sequentially allocate the resource for each one of service flows which follow one-by-one in the frame structure. In other words, there is no unused resource between each one of the service flows. The E-MBS region 1 shown in FIG. 2 illustrates a continuing accumulation of multiple of resource units, for example, in an E-MBS region 15 as shown in FIG. 1B. Also, the resource units shown in FIG. 2 are just for downlink transmission. The E-MBS region 1 includes a plurality of service flows such as indicated by flow 1, flow 2 and flow 3 as shown in FIG. 2. Also, the basic resource unit is defined by a subframe in time domain and a resource unit in frequency domain. The resource indication for each one of the service flows is stored in the E-MBS MAP. In the first exemplary embodiment, the E-MBS MAP is followed (straight) by a first service flow (as indicated by flow 1 in FIG. 2). As can be shown in FIG. 2, the first service flow is followed by the second service flow (i.e., the flow 2), and the second service flow is followed by the third service flow (i.e., the flow 3). The invention is not limited to three service flows and can be applied to the situation where the E-MBS region includes any number of service flows. The resource indication method proposed by the invention will be described further in details in accordance with FIG. 4 to FIG. 10.

Moreover, the resource allocation method sequentially allocates the resource units of each one of service flows by increasing frequency domain location in a time domain location until the boundary of the E-MBS region is reached. Then, the resource allocation method continues to allocate resource units of the current service flow from the top of the E-MBS region in the next time domain location. With the frame structure and the aforementioned resource allocation method, just two parameters are needed to indicate the resources for each one of the service flows.

As can be shown in FIG. 2, the first service flow is allocated straight after the end of the E-MBS MAP until the end of the frequency domain is reached (i.e., the location A in FIG. 2) in the first time domain (i.e., the first subframe), then the first service is further allocated in the second time domain (i.e., the second subframe) from a location B to a location C, and further allocated in the third time domain from a location D to a location E, where the location E is the end of the first service flow and the first service flow is followed by the second service flow after the location E. The aforementioned resource allocation method is continued to be applied to the second service flow in the same way as the first service flow being allocated until a location F, where the second service flow is ended at the location F and the location F is followed directly by the third service flow.

Figure 3:
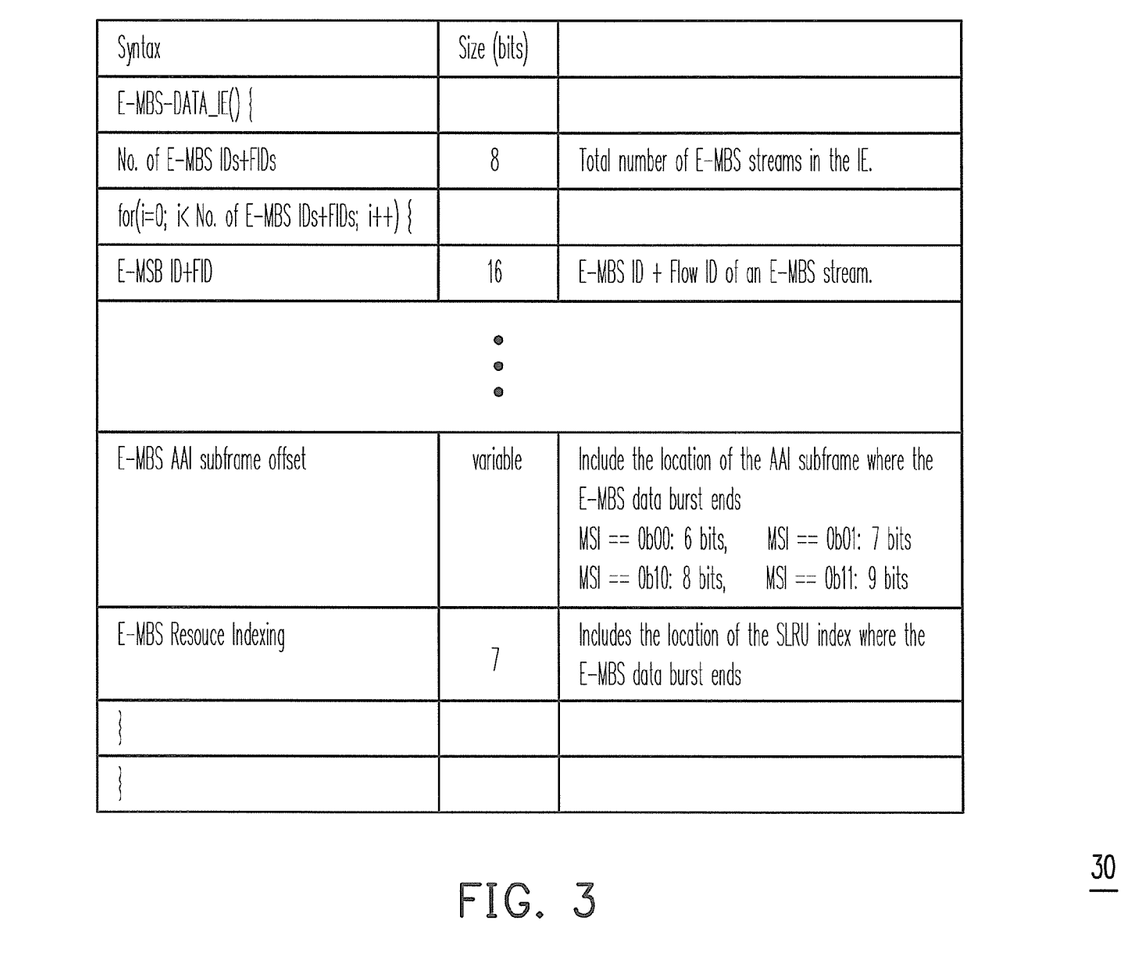
FIG. 3 is table illustrates parameters associated with the resource allocation method shown in FIG. 2.

FIG. 3 is table 30 illustrates parameters associated with the resource allocation method shown in FIG. 2.

The table 30 indicates that the E-MBS data information element (IE) (as indicated by E-MBS-DATA_IE) includes at least a field indicating the total number of E-MBS streams in the IE (i.e., "No. of E-MBS IDs+FIDs") in 8 bits, a "for loop" containing the information of each E-MBS stream. The E-MBS stream represents the E-MBS service flow. The "for loop" further includes at least a filed indicating "E-MBS ID+Flow ID of an E-MBS stream" (i.e., "E-MBS ID+FID") in 16 bits, a field indicating "the location of Advanced Air Interface (AAI) subframe where the E-MBS data burst ends" (i.e., "E-MBS AAI subframe offset") in variable bits, and a field indicating "the location of the service logical resource unit (SLRU) index where the E-MBS data burst ends" (i.e., "E-MBS Resource Indexing") in 7 bits. The four MSIs in the Notes section corresponding to the "E-MBS AAI subframe offset" provides the effective interval for four different cases, but the details of the effective interval and MSI values will not be described in details in the present disclosure. Moreover, the "E-MBS AAI subframe offset" provides the absolute location where the E-MBS data for one specific service flow ends in time domain. The "E-MBS Resource Indexing" provides an absolute location where the E-MBS data for one specific service flow ends in frequency domain (i.e., an E-MBS region).

However, the invention is not limited to FIG. 2, and the concept of the resource allocation method can be generalized as the following. The service flows for an E-MBS zone are successively allocated in the E-MBS region, as illustrated in FIG. 2. The data of service flow 1 are partitioned in to basic resource units, such as physical resource unit (PRU) or subband. The data of the service flow 1 are allocated exactly following the E-MBS A-MAP of the E-MBS region. The resource units for service flow 1 are sequentially allocated by increasing the PRU or subband index in the same time domain (subframe index). When the region boundary (the largest PRU or subband index in frequency domain in the E-MBS region) is reached, then the resource units of the current service flow 1 are continued to be allocated at the top of the region (i.e., the smallest PRU or the smallest subband index in frequency domain in the E-MBS region) in the next subframe (time domain). The resources for service flow 1 are allocated by following the aforementioned approach.

The end of resource units of the service flow 1 is followed by the resource units being allocated for service flow 2, and the resource units for service flow 2 are sequentially allocated by increasing the PRU or subband index in the same time domain (subframe index). When the region boundary (largest PRU or subband index in frequency domain in the E-MBS region) is reached, then the resource units are continued to be allocated at the top of the E-MBS region (i.e., the smallest PRU or subband index in frequency domain in the E-MBS region) in the next subframe (time domain). The remaining service flows are allocated in the same way to the abovementioned approach until all service flows are completely allocated in the E-MBS region.

Figure 4:
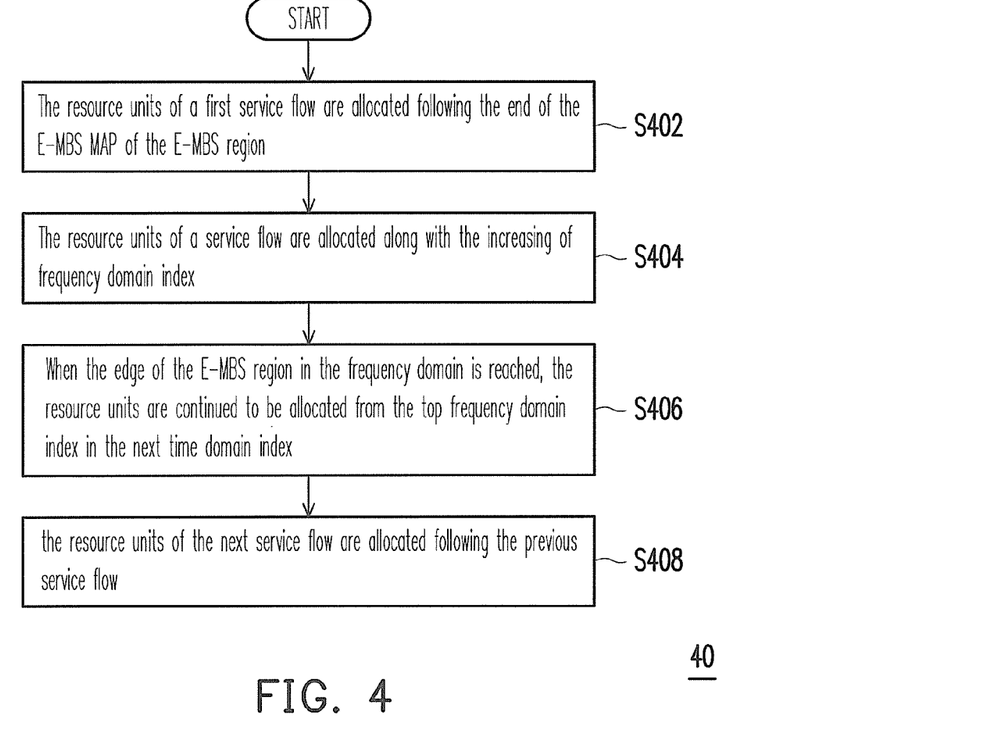
FIG. 4 is a flowchart illustrating a resource allocation method according to a first exemplary embodiment.

FIG. 4 is a flowchart illustrating a resource allocation method 40 according to a first exemplary embodiment. The resource allocation method 40 starts at step S402 At the step S402, the resource units of a first service flow are allocated following the end of the E-MBS MAP of the E-MBS region. At step S404, the resource units of a service flow are allocated along with the increasing of frequency domain index. In other words, resource units of an mth service flow are allocated along with the increasing of frequency domain index, where m is an integer greater than and equal to 1.

At step S406, when the edge of the MBS region in the frequency domain is reached, the resource units of the current service flow are continued to be allocated from the top frequency domain index in the next time domain index. Also, in other words, as being continued from the step S406, the resource units of the mth service flow are continued to be allocated from the top frequency domain index in the next time domain index.

At step S408, the resource units of the next service flow are allocated following the previous service flow. In other words, the resource units of m+1 th service flow are allocated following the mth service flow. The resource allocation method 40 repeats the step S404 to the S408 until all service flows are allocated required resource units in the E-MBS region.

The invention proposes at least seven resource indication methods for resource indication for each one of the service flows in the E-MBS region. The resource indication methods are all based upon the aforementioned resource allocation method described in accordance with FIG. 2 and FIG. 3. It is assumed that there are m service flows for the E-MBS zone. The frequency index can be PRU index or subband index. The resource indication methods are described in details in accordance with FIG. 4 to FIG. 10.

Figure 5:
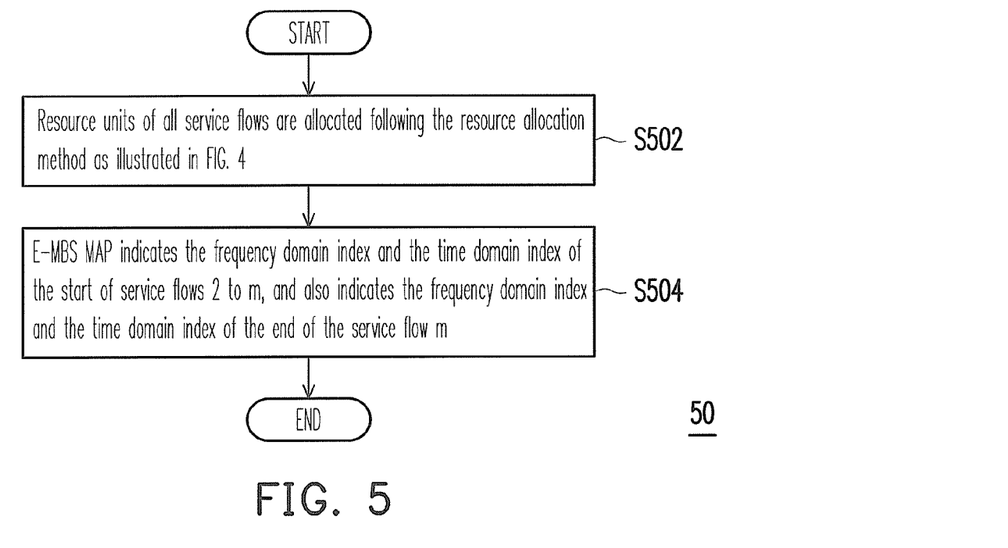
FIG. 5 is a flowchart illustrating a resource indication method according to a second exemplary embodiment of the invention.

FIG. 5 is a flowchart illustrating a resource indication method 50 according to a second exemplary embodiment of the invention. In the second exemplary embodiment, the resource indication method 50 starts at the step S502. At the step S502, the resource units of all service flows are allocated following the resource allocation method 40 as illustrated in FIG. 4. At the step S504, the E-MBS MAP indicates the frequency index (or frequency domain index) and the subframe index (or time domain index) of the start of service flows 2 to m, and also indicates the frequency index (or frequency domain index) and the subframe index (or time domain index) of the end of service flow m, where the service flow m represents the last service flow. The resource indication method 50 is terminated after the step S504. As described previously in the first exemplary embodiment, the resource units of the first service flow is allocated straight after the end of the E-MBS MAP, so the start of the first service flow can be easily located by receiving terminals or MSs.

Figure 6:
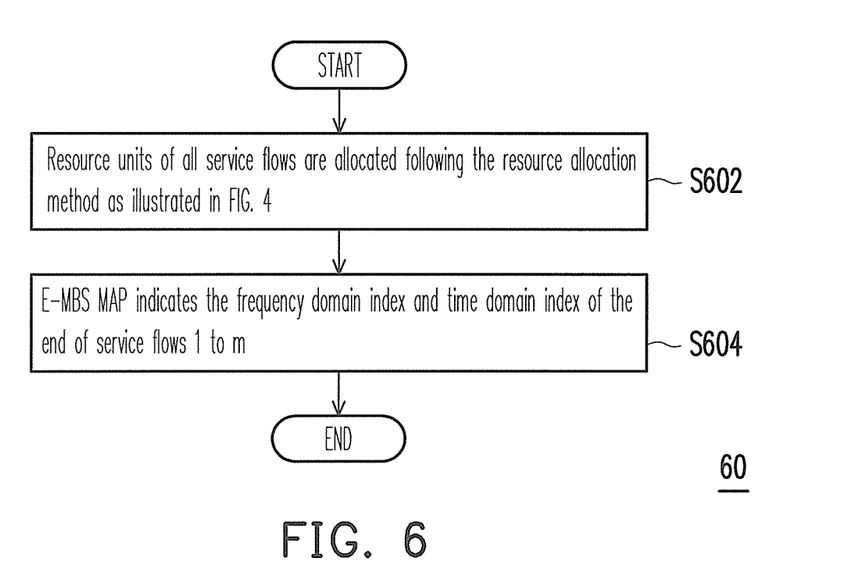
FIG. 6 is a flowchart illustrating another resource indication method according to a third exemplary embodiment of the invention.

FIG. 6 is a flowchart illustrating another resource indication method 60 according to a third exemplary embodiment of the invention. In the third exemplary embodiment, the resource indication method 60 starts at the step S602. At the step S602, the resource units of all service flows are allocated following the resource allocation method 40 as illustrated in FIG. 4. At the step S604, the E-MBS MAP indicates the frequency index (or frequency domain index) and subframe index (or time domain index) of the end of service flows 1 to m, where the service flow m represents the last service flow. The resource indication method 60 is terminated after the step S604. As described previously in the first exemplary embodiment, the resource units of the second service flow is allocated straight after the end of the first service flow, so the start of the second service flow can be easily located by receiving terminals or MSs. Accordingly, the start of the third service flow to the last service flow can also be found according to the resource indication method 60 described in the third exemplary embodiment.

Figure 7:
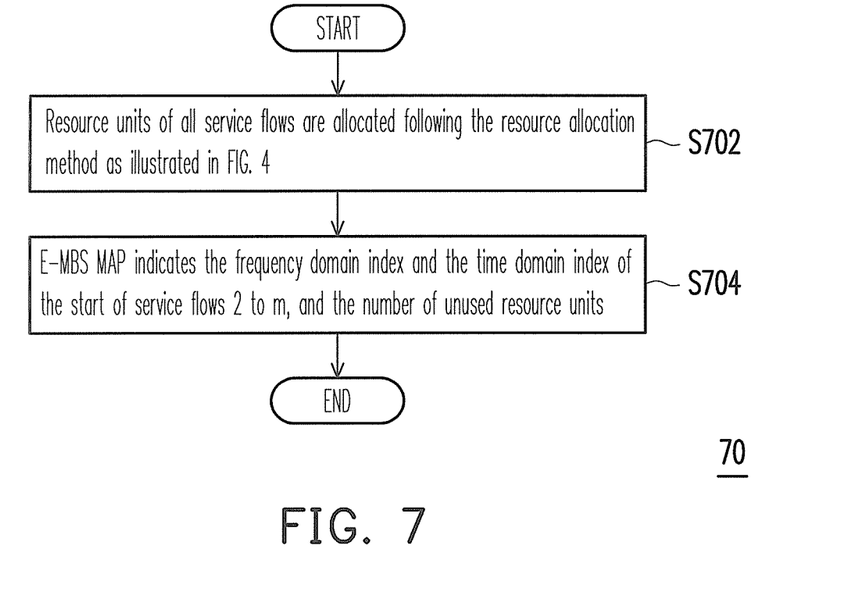
FIG. 7 is a flowchart illustrating another resource indication method according to a fourth exemplary embodiment of the invention.

FIG. 7 is a flowchart illustrating another resource indication method 70 according to a fourth exemplary embodiment of the invention. In the fourth exemplary embodiment, the resource indication method 70 starts at the step S702. At the step S702, the resource units of all service flows are allocated following the resource allocation method 40 as illustrated in FIG. 4. At the step S704, the E-MBS MAP indicates the frequency (or frequency domain index) and the subframe index (or time domain index) of the start of service flows 2 to m, and the number of unused resource units (PRU or subband), where the service flow m represents the last service flow. The resource indication method 70 is terminated after the step S704. As described previously in the first exemplary embodiment, the resource units of the first service flow is allocated straight after the end of the E-MBS MAP, so the start of the first service flow can be easily located by receiving terminals or MSs. Since the effective region of the E-MBS region can be known to the receiving terminals or the MSs, the end of the last service flow can be found according to the number of unused resource units by the receiving terminals or the MSs.

Figure 8:
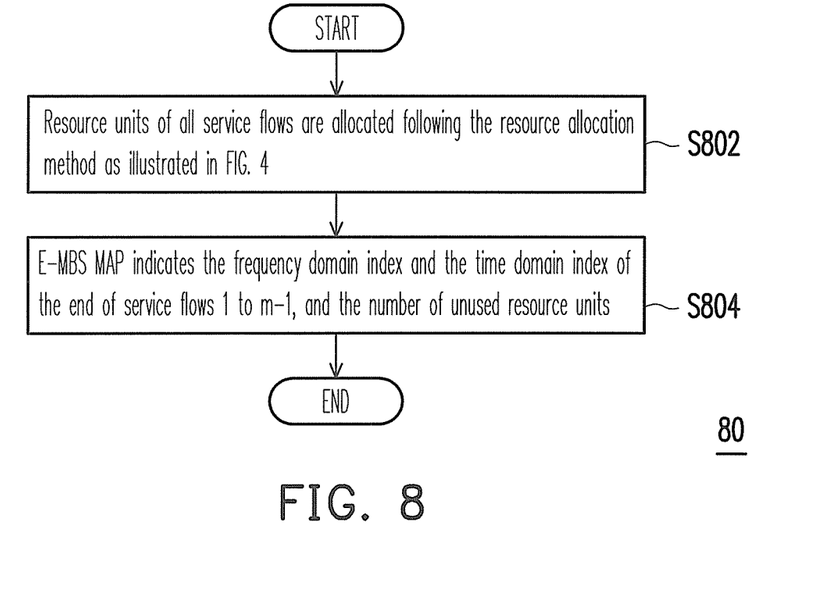
FIG. 8 is a flowchart illustrating another resource indication method according to a fifth exemplary embodiment of the invention.

FIG. 8 is a flowchart illustrating another resource indication method 80 according to a fifth exemplary embodiment of the invention. In the fifth exemplary embodiment, the resource indication method 80 starts at the step S802. At the step S802, the resource units of all service flows are allocated following the resource allocation method 40 as illustrated in FIG. 4. At the step S804, the E-MBS MAP indicates the frequency (or frequency domain index) and the subframe index (or time domain index) of the end of service flows 1 to m−1, and the number of unused resource units (PRU or subband), where the service flow m−1 represents the second last service flow. The resource indication method 80 is terminated after the step S804. As described previously in the first exemplary embodiment, the resource units of the first service flow is allocated straight after the end of the E-MBS MAP and the first service flow is straight followed by the second service flow, the start of the second service flow to the last service flow can be easily derived by the end of service flows 1 to m−1.

Figure 9:
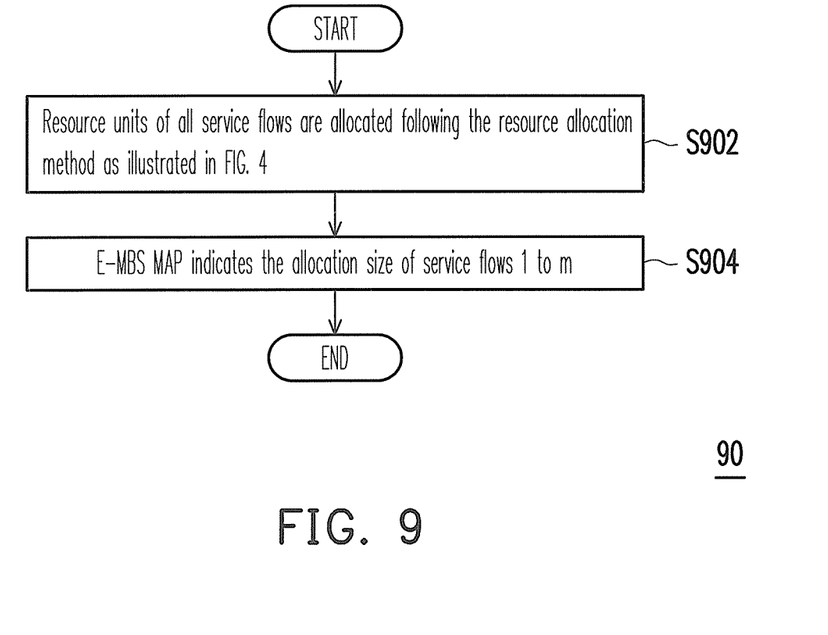
FIG. 9 is a flowchart illustrating another resource indication method according to a sixth exemplary embodiment of the invention.

FIG. 9 is a flowchart illustrating another resource indication method 90 according to a sixth exemplary embodiment of the invention. In the sixth exemplary embodiment, the resource indication method 90 starts at the step S902. At the step S902, the resource units of all service flows are allocated following the resource allocation method 40 as illustrated in FIG. 4. At the step S904, the E-MBS MAP indicates the allocation size of service flows 1 to m, where the service flow m represents the last service flow. The resource indication method 90 is terminated after the step S904. As described previously in the first exemplary embodiment, the resource units of the first service flow is allocated straight after the end of the E-MBS MAP so the start of the first service flow can be easily located by the receiving terminals or the MSs. Also, the start of the last service flow can be easily found by successively accumulating the allocation size of the service flows 1 to m−1.

Figure 10:
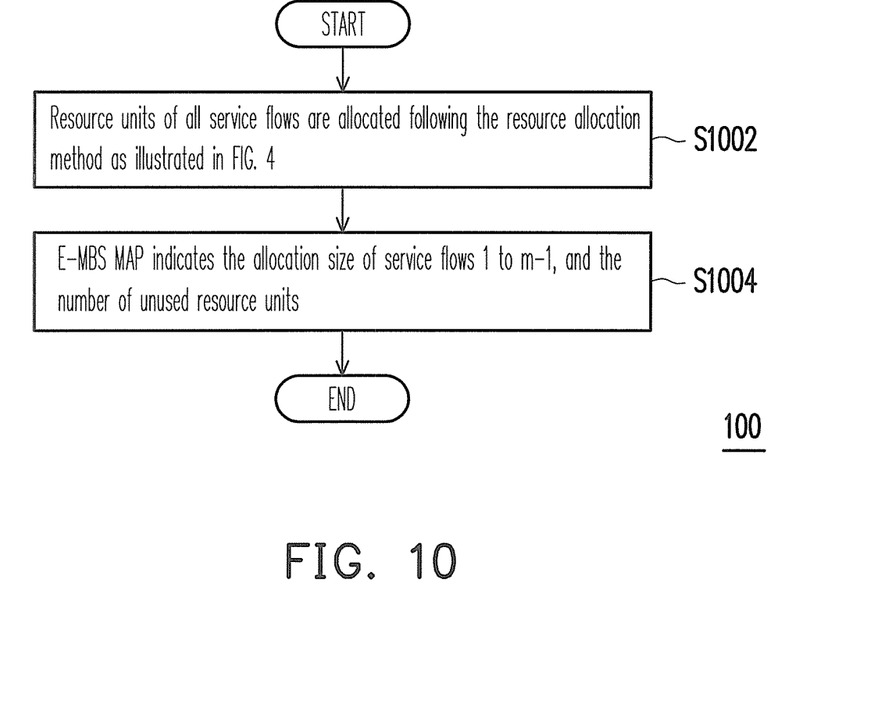
FIG. 10 is a flowchart illustrating another resource indication method according to a seventh exemplary embodiment of the invention.

FIG. 10 is a flowchart illustrating another resource indication method 100 according to a seventh exemplary embodiment of the invention. In the seventh exemplary embodiment, the resource indication method 100 starts at the step S1002. At the step S1002, the resource units of all service flows are allocated following the resource allocation method 40 as illustrated in FIG. 4. At the step S1004, the E-MBS MAP indicates the allocation size of service flows 1 to m−1, and the number of unused resource units (PRU or subband), where the service flow m−1 represents the second last service flow. The resource indication method 100 is terminated after the step S1004. As described previously in the sixth exemplary embodiment, the start of the first service flow can be easily located at the end of the E-MBS MAP by the receiving terminals or the MSs. Also, the start of the last service flow can be easily found by successively accumulating the allocation size of the service flows 1 to m−1. The end of the last service flow can be found by counting backward from the end of the E-MBS region by the number of unused resource units.

Figure 11:
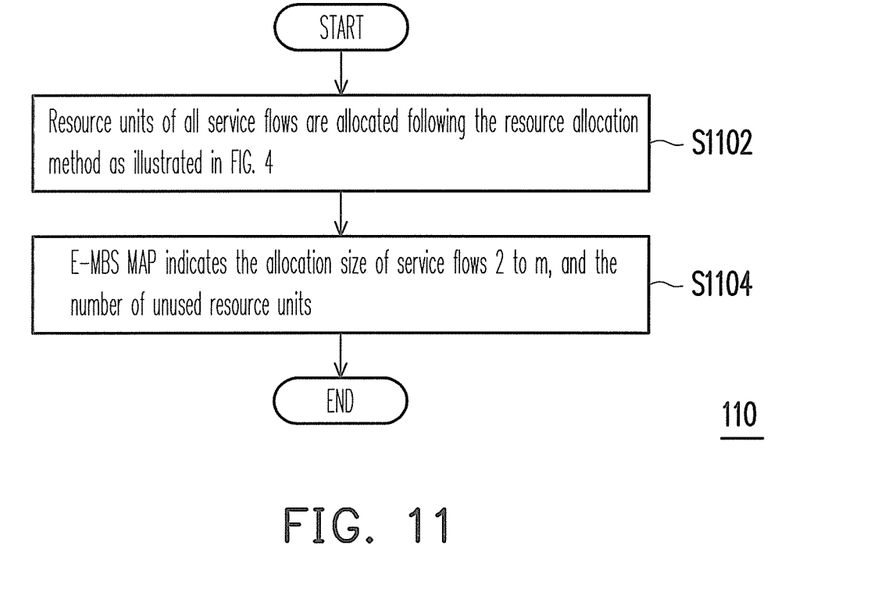
FIG. 11 is a flowchart illustrating another resource indication method according to an eighth exemplary embodiment of the invention.

FIG. 11 is a flowchart illustrating another resource indication method 1100 according to an eighth exemplary embodiment of the invention. In the seventh exemplary embodiment, the resource indication method 1100 starts at the step S1102. At the step S1102, the resource units of all service flows are allocated following the resource allocation method 40 as illustrated in FIG. 4. At the step S1104, the E-MBS MAP indicates the allocation size of service flows 2 to m, and the number of unused resource units (PRU or subband), where the service flow m represents the last service flow. The resource indication method 1100 is terminated after the step S1104. As described previously in the sixth exemplary embodiment, the start of the first service flow can be easily located at the end of the E-MBS MAP by the receiving terminals or the MSs. The end of the last service flow can be found by counting backward from the end of the E-MBS region by the number of unused resource units. Also, the start of the last service flow can be easily found by backward counting from the end of last service flow by allocation size of the last service flow. The start and the end of the second service flow to the second last service flow can be found in a similar way as described for the last service flow.

Figure 12:
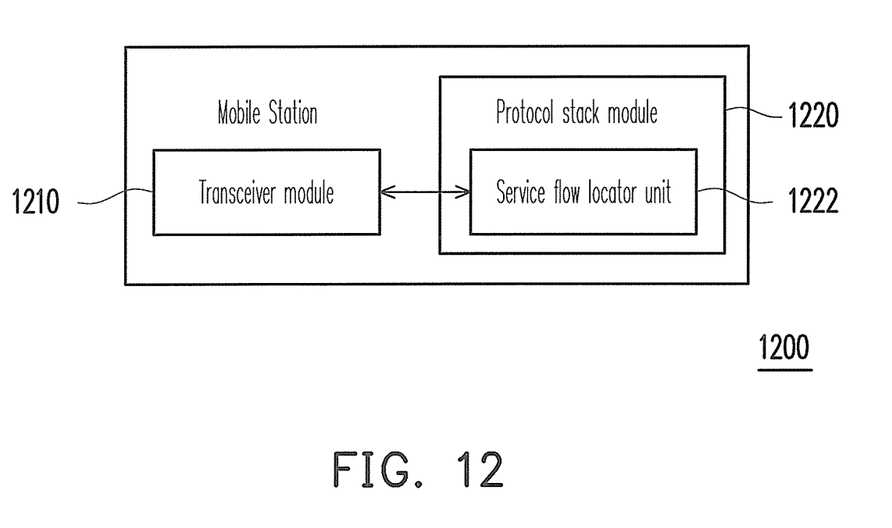
FIG. 12 is a functional block diagram of a mobile station according to an exemplary embodiment of the invention.

FIG. 12 is a functional block diagram of a mobile station 1200 according to an exemplary embodiment of the invention. The mobile station 1200 decodes a service flow or plurality of service flows in a frame of an E-MBS system. The mobile station 1200 includes at least a transceiver module 1210 and a protocol stack module 1220. The protocol stack module 1220 further includes a service flow locator unit 1222. The transceiver module 1210 is coupled to an antenna module (not illustrated) for receiving an E-MBS region or a plurality of E-MBS regions broadcast or multicast in the E-MBS system, for example, by the base station BS2 in FIG. 1A. The protocol stack module 1220 is coupled to the transceiver module 1210 for receiving an E-MBS region and performing associated processing on the E-MBS region. The service flow locator unit 1222, is coupled to the transceiver module 1210, and performs searching the location of a specific service flow in the E-MBS region according to the indication provided at the E-MBS MAP in the E-MBS region. The E-MBS MAP can indicate the resource of service flows by any one of the resource indication methods in the aforementioned embodiments. Once the start and the end of the specific service flow are found, the protocol stack module 1220 can decode the service flow for acquiring the E-MBS data.

In summary, according to exemplary embodiments of the invention, a resource allocation method, a resource indication method and a mobile station using the same rule are proposed. Resource units of each one of the service flows are allocated sequentially in the E-MBS region with the first service flow follows the end of the E-MBS MAP along with the increasing of frequency domain index. When the edge of the E-MBS region in the frequency domain is reached, the resource is continued to be allocated from the top frequency domain index in the next time domain index. The resource units of the remaining service flow are allocated according to the resource allocation method. The resource indication method intelligently provides absolute location of the start or the end of some or all of service flows, thereby enhancing the E-MBS system performance and improving decoding efficiency at receiving terminals.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A resource allocation method, for allocating resource units for service flows in an E-MBS region of an E-MBS system, the method comprising:
    (a) allocating the resource units of a first service flow following the end of E-MBS MAP of the E-MBS region, wherein a width of each of the resource units on a time domain is equal to a subframe;
    (b) allocating the resource units of an $m^{th}$ service flow along with the increasing of frequency domain index, wherein m is an integer greater than or equal to 1;
    (c) continuing to allocate the resource units of the $m^{th}$ service flow from the top frequency domain index in the next time domain index when the edge of the E-MBS region in the frequency domain is reached;
    (d) allocating the resource units of a $m+1^{th}$ service flow following the $m^{th}$ service flow; and
    (e) repeating the step (b), the step (c) and the step (d) until all service flows are allocated required resource units.

2. A resource indication method, for indicating service flows in a frame of an E-MBS system, the method comprising:
    indicating, at E-MBS MAP of the E-MBS region, the location of each one of at least a service flow in the E-MBS region; and
    indicating at the E-MBS MAP of the E-MBS region, the time domain index and the frequency domain index at the end of each one of the at least a service flow,
    wherein the resource units of a first service flow are allocated following the end of E-MBS MAP of the E-MBS region, and the resource units of an $m+1^{th}$ service flow are allocated following the $m^{th}$ service flow, wherein m is an integer greater than or equal to 1, wherein a width of each of the resource units on a time domain is equal to a subframe.

3. The resource indication method according to claim 2, wherein the method further comprising:
    indicating, at the E-MBS MAP of the E-MBS region, the time domain index and the frequency domain index at the start of each one of the at least a service flow.

4. The resource indication method according to claim 3, wherein the E-MBS MAP indicates the frequency domain index and the time domain index of the start of the second service flow to the last service flow, and also indicates the frequency domain index and the time domain index of the end of the last service flow.

5. The resource indication method according to claim 3, wherein the E-MBS MAP indicates the frequency domain index and the time domain index of the start of second service flow to the last service flow, and the number of unused resource units.

6. The resource indication method according to claim 2, wherein the E-MBS MAP indicates the frequency domain index and the time domain index of the end of the first service flow to the last service flow.

7. The resource indication method according to claim 2, wherein the E-MBS MAP indicates the frequency domain index and the time domain index of the end of the first service flow to the second last service flow, and the number of unused resource units.

8. The resource indication method according to claim 2, wherein the E-MBS MAP indicates the allocation size of the first service flow to the last service flow.

9. The resource indication method according to claim 2, wherein the E-MBS MAP indicates the allocation size of the first service flow to the second last service flow, and the number of unused resource units.

10. The resource indication method according to claim 2, wherein the E-MBS MAP indicates the allocation size of the second service flow to the last service flow, and the number of unused resource units.

11. The resource indication method according to claim 2, wherein, the resource units of the $m^{th}$ service flow are allocated along with the increasing of frequency domain index; and
    the resource units of the nth service flow are continued to be allocated from the top frequency domain index in the next time domain index when the edge of the E-MBS region in the frequency domain is reached.

12. A mobile station, for decoding service flows in a frame of an E-MBS system, wherein the frame comprises at least an EMS region, the mobile station comprising:
    at least a transceiver module, configured to receive at least an E-MBS region broadcast or multicast in the E-MBS system; and
    at least a protocol stack module, coupled to the at least a transceiver module, wherein the least a protocol stack module comprises:

at least a service flow locator unit, configured to search the location of a specific service flow in the at least an E-MBS region according to the location of each one of the at least a service flow in the at least an E-MBS region indicated at the E-MBS MAP in the at least an E-MBS region, wherein the resource units of a first service flow are allocated following the end of E-MBS MAP of the at least an E-MBS region, and the resource units of an $m+1^{th}$ service flow are allocated following the $m^{th}$ service flow, wherein n is an integer greater than or equal to 1, wherein a width of each of the resource units on a time domain is equal to a subframe, wherein the E-MBS MAP of the at least an E-MBS region indicates the time domain index and the frequency domain index at the end of each one of the at least a service flow.

13. The mobile station according to claim 12, wherein the E-MBS MAP of the at least an E-MBS region indicates the time domain index and the frequency domain index at the start of each one of the at least a service flow.

14. The mobile station according to claim 12, wherein the E-MBS MAP indicates the allocation size of the first service flow to the last service flow.

15. The resource indication method according to claim 12, wherein the E-MBS MAP indicates the allocation size of the first service flow to the second last service flow, and the number of unused resource units.

16. The resource indication method according to claim 12, wherein the E-MBS MAP indicates the allocation size of the second service flow to the last service flow, and the number of unused resource units.

17. The mobile station according to claim 12, wherein the resource units of the mth service flow are allocated along with the increasing of frequency domain index; and the resource units of the $m^{th}$ service flow are continued to be allocated from the top frequency domain index in the next time domain index when the edge of the at least an E-MBS region in the frequency domain is reached.

* * * * *